(12) United States Patent
Lee

(10) Patent No.: US 8,508,869 B2
(45) Date of Patent: Aug. 13, 2013

(54) LENS MODULE WITH ELECTROSTRICTIVE MEMBER FOR DRIVING LENES

(75) Inventor: Han-Lung Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/457,436

(22) Filed: Apr. 26, 2012

(65) Prior Publication Data
US 2012/0206815 A1    Aug. 16, 2012

Related U.S. Application Data

(62) Division of application No. 12/423,083, filed on Apr. 14, 2009, now Pat. No. 8,238,046.

(30) Foreign Application Priority Data
Nov. 28, 2008    (CN) .......................... 2008 1 0305858

(51) Int. Cl.
G02B 7/02    (2006.01)
(52) U.S. Cl.
USPC .......................................... 359/819

(58) Field of Classification Search
USPC .......................................... 359/676, 819, 824
See application file for complete search history.

(56) References Cited

U.S. PATENT DOCUMENTS

2006/0028743 A1* 2/2006 Yamashita et al. ............ 359/824
2009/0184605 A1* 7/2009 Chen ............................. 310/357

* cited by examiner

*Primary Examiner* — James Greece
(74) *Attorney, Agent, or Firm* — Altis Law Group, Inc.

(57) ABSTRACT

An exemplary lens module includes a first lens array, a second lens array, an electrostrictive member and a power supply. The first lens array includes first lenses, and the second lens array includes second lenses, an optical axis of each second lens being aligned with that of the corresponding first lens. The electrostrictive member is made from an artificial muscle material spacing the first lens array and the second lens array. A thickness direction of the electrostrictive member is parallel to optical axes of the first lenses and second lenses, and the electrostrictive member is deformable along the thickness direction thereof when an electric current is applied thereon, thereby driving the first and second lens arrays to move toward or away from each other. The power supply is electrically connected to the electrostrictive member to provide the electric current to the electrostrictive member.

3 Claims, 3 Drawing Sheets

LENS MODULE WITH ELECTROSTRICTIVE MEMBER FOR DRIVING LENES

CROSS-REFERENCE TO RELATED APPLICATION

This application is a divisional application of a commonly-assigned application entitled "LENS MODULE WITH ELECTROSTRICTIVE MEMBER FOR DRIVING LENES", filed on Apr. 14, 2009 with application Ser. No. 12/423,083. The disclosure of the above-identified application is incorporated herein by reference.

BACKGROUND

1. Technical Field

The present invention relates to lens modules, and particularly, to a lens module having a lens driving mechanism therein.

2. Description of Related Art

With ongoing developments of microcircuitry and multimedia technology, camera modules, including, for example, still camera modules and digital camera modules, are now in widespread use and are being combined with various electronic devices. These camera modules are usually required to have autofocus and zoom function.

Lens modules and image sensors are key components in camera modules. A typical lens module includes a lens assembly and a lens driving mechanism. The lens driving mechanism can be, e.g., a step motor configured for driving the lens assembly to move relative to the image sensor, or driving a single lens of the lens assembly to move, thereby achieving the autofocus or zoom function of the camera module. However, a typical step motor is heavy and bulky, and consumes a substantial amount of power, especially relative to the amount of power that can be stored in a typical battery system of a camera or an electronic device.

Therefore, there is room for improvement within the art.

BRIEF DESCRIPTION OF THE DRAWINGS

Many aspects of the present lens module can be better understood with reference to the following drawings. The components in the drawings are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF EXEMPLARY EMBODIMENTS

Exemplary embodiments of the present lens module will now be described in detail below and with reference to the drawings.

Figure 1:
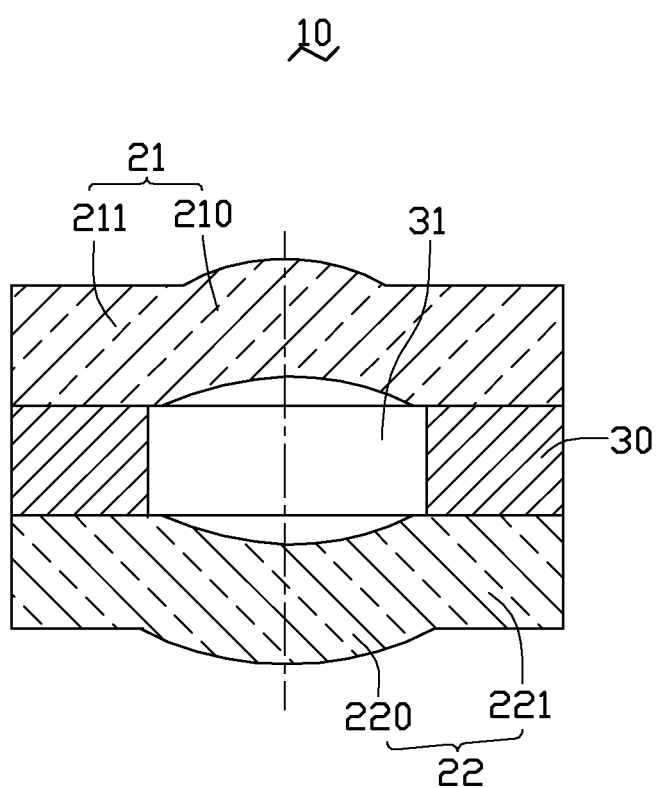
FIG. 1 is a schematic view of a lens module in accordance with a first exemplary embodiment, the lens module including an electrostrictive member sandwiched between lenses.

Referring to FIG. 1, an exemplary lens module 10 in accordance with a first exemplary embodiment, is shown. The lens module 10 includes a first lens 21, a second lens 22 and an electrostrictive member 30 sandwiched between the first lens 21 and the second lens 22. In present exemplary embodiment, the first lens 21, the second lens 22 and the electrostrictive member 30 are generally ring-shaped.

The first lens 21 has a central optical portion 210 and a peripheral portion 211 surrounding the central optical portion 210. The second lens 22 has a central optical portion 220 and a peripheral portion 221 surrounding the central optical portion 220. An optical axis of the first lens 21 is aligned with that of the second lens 22 (see dash line in FIGS. 1 and 2).

The electrostrictive member 30 is made from deformable materials, such as an artificial muscle material. The artificial muscle material may be, e.g., ferroelectric polymers or dielectric elastomers. Such artificial muscle materials are capable of deforming in a direction when an electric current with an intensity is applied thereto, and capable of returning back to its undeformed shape when the electric current is removed. A thickness direction of the electrostrictive member 30 is parallel to optical axes of the first lens 21 and the second lens 22. In the present exemplary embodiment, the electrostrictive member 30 is deformable in the thickness direction thereof. The electrostrictive member 30 has a first surface 301 and a second surface 302 on opposite sides in the thickness direction. The first surface 301 is adhered to the peripheral portion 211 of the first lens 21. The second surface 302 is adhered to the peripheral portion 221 of the second lens 22.

A through hole 31 is defined in a center of the electrostrictive member 30, for facilitating light passing through. A central axis of the through hole 31 is aligned with the optical axes of the first and second lenses 21, 22. In an alternative exemplary embodiment, the electrostrictive member 30 is transparent to light, and the through hole 31 is omitted.

Figure 2:
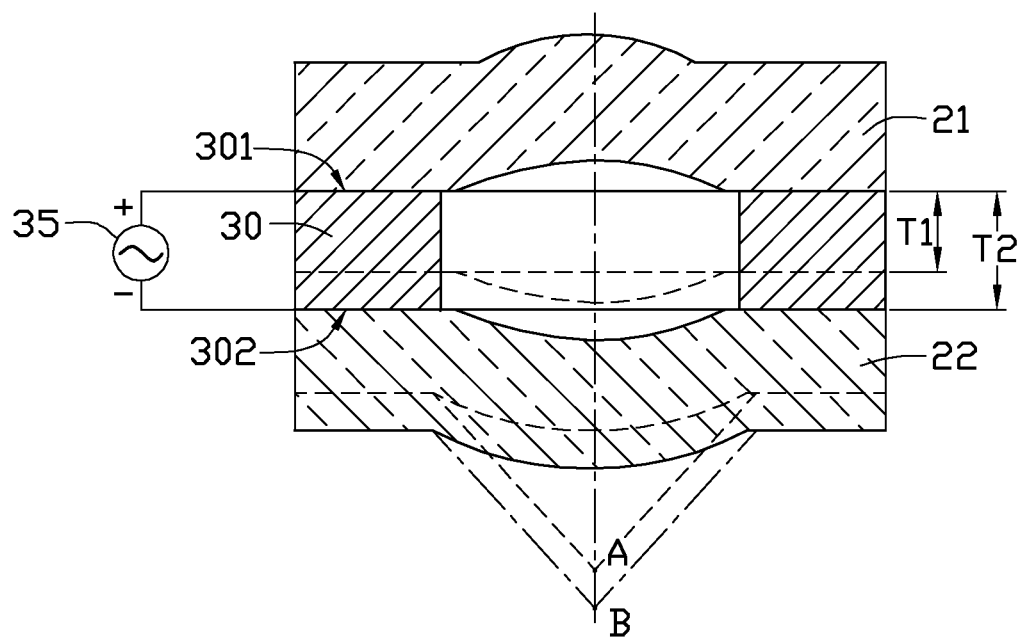
FIG. 2 is a schematic view showing a deformation of the electrostrictive member of FIG. 1, wherein a lens position and a focus point of the entire lens module are correspondingly changed.

Referring to FIG. 2, a deformation of the electrostrictive member 30 is shown when a power supply 35 provides an electric current to the electrostrictive member 30. The first surface 301 and the second surface 302 are electrically connected to a positive electrode and a cathode electrode of the power supply 35, respectively. In the illustrated embodiment, when the electrostrictive member 30 deforms, only the second lens 22 is moved. The broken lines in FIG. 2 show an original position of the second lens 22 and an original focus point A of the entire lens module when the electrostrictive member 30 is in T1 thickness. When the electrostrictive member 30 deforms from the T1 thickness to T2 thickness, a space between the first lens 21 and the second lens 22 is correspondingly increased, and the focus point of the entire lens module is changed from A to B. Preferably, a control unit (not shown) is provided to control an intensity of the electric current, such that the deformation degree of the electrostrictive member 30 can be changed. It is understood that, in an alternative exemplary embodiment, the electrostrictive member 30 is capable of driving the first lens 21 and the second lens 22 to move.

Figure 3:
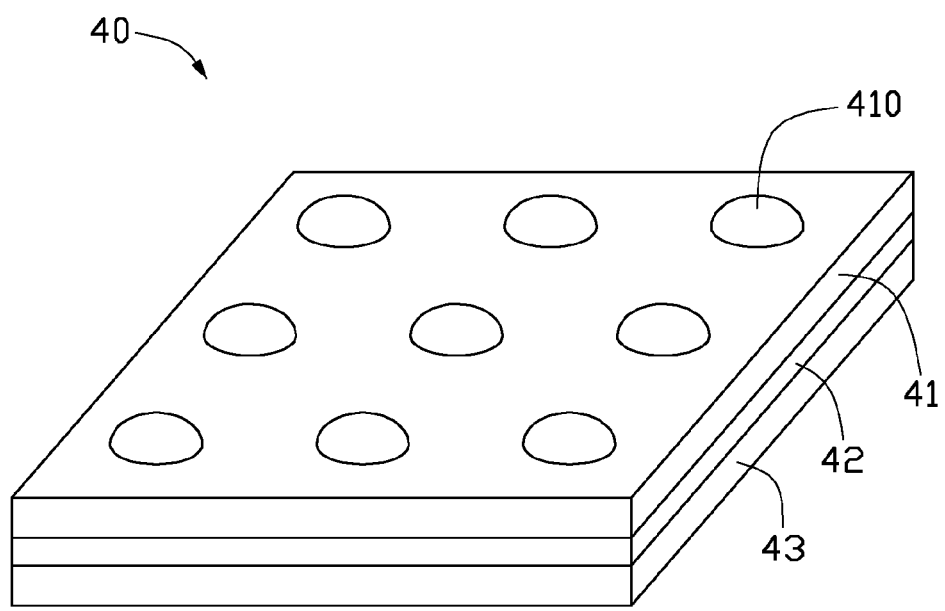
FIG. 3 is an isometric view of a lens module in accordance with a second exemplary embodiment.

Referring to FIG. 3, a lens module 40 in accordance with a second exemplary embodiment is shown. The lens module 40 includes a first lens array 41, a second lens array 43 and an electrostrictive member 42 sandwiched between the first lens array 41 and the second lens array 43. The first lens array 41, the second lens array 43 and the electrostrictive member 42 are generally square-shaped. The first lens array 41 includes a plurality of first lenses 410, the second lens array 43 includes the same quantity of second lenses (not shown), and the first lenses 410 align with the respective second lenses. The electrostrictive member 42 can have a plurality of through hole (not shown) therein, for facilitating light passing through.

It is understood that the above-described exemplary embodiments are intended to illustrate rather than limit the invention. Variations may be made to the exemplary embodiments without departing from the spirit of the invention. Accordingly, it is appropriate that the appended claims be construed broadly and in a manner consistent with the scope of the invention.

What is claimed is:

1. A lens module comprising:
    a first lens array comprising a plurality of first lenses;
    a second lens array comprising a plurality of second lenses, an optical axis of each second lens being aligned with that of the corresponding first lens;
    an electrostrictive member made from an artificial muscle material, the electrostrictive member sandwiched between the first lens array and the second lens array and spacing the first lens array and the second lens array, the electrostrictive member having a first surface and a second surface on an opposite side thereof to the first surface, the first surface directly adhered to the first lenses, and the second surface directly adhered to the second lenses, a thickness direction of the electrostrictive member parallel to optical axes of the first lenses and second lenses, the electrostrictive member deforming along the thickness direction thereof when an electric current is applied thereto, thereby driving the first and second lens arrays to move toward or away from each other; and
    a power supply being electrically connected to the electrostrictive member to provide the electric current to the electrostrictive member.

2. The lens module of claim 1, wherein the electrostrictive member has a plurality of through holes defined therein, the through holes being aligned with the respective first lenses and second lenses.

3. The lens module of claim 1, wherein the artificial muscle material is selected from a group consisting of ferroelectric polymers and dielectric elastomers.

* * * * *